(12) United States Patent
Lv et al.

(10) Patent No.: US 12,181,740 B1
(45) Date of Patent: Dec. 31, 2024

(54) CURVED DEVICES

(71) Applicant: Apple Inc., Cupertino, CA (US)

(72) Inventors: Peng Lv, San Jose, CA (US); Mahmut Tosun, San Jose, CA (US); Ho Hyung Lee, San Jose, CA (US); Paul W Tsao, Los Altos, CA (US); Da Yu, San Jose, CA (US); Michael Vosgueritchian, San Francisco, CA (US); Francois R Jacob, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/323,906

(22) Filed: May 25, 2023

Related U.S. Application Data (60) Provisional application No. 63/356,786, filed on Jun. 29, 2022.

(51) Int. Cl.
 *G02F 1/1333* (2006.01)
(52) U.S. Cl.
 CPC .............................. *G02F 1/133331* (2021.01)

(58) Field of Classification Search
 CPC ......... G02F 1/133325; G02F 1/133322; G02F 1/133308; G02F 1/1313; G02F 1/133331
 See application file for complete search history.

(56) References Cited

U.S. PATENT DOCUMENTS

| 10,755,613 B2 | 8/2020 | Brubaker |
| 10,781,128 B2 | 9/2020 | An et al. |
| 11,009,983 B2 | 5/2021 | Boggs et al. |
| 2021/0309107 A1 | 10/2021 | Benjamin et al. |

*Primary Examiner* — Anne M Hines
*Assistant Examiner* — Jose M Diaz
(74) *Attorney, Agent, or Firm* — Treyz Law Group, P.C.; David K. Cole (57) ABSTRACT

A transparent structure may have layers with curved cross-sectional profiles. The transparent structure may have inner and outer layers with curved portions formed by bending the layers. A display may be applied to one or more of the inner and outer layers. To reduce the strain applied to the display while being bent into a desired curvature, a carrier film may be used during bending operations. The carrier film may be modified with a patch or openings distribute the strain evenly across the display. Additionally or alternatively, a convex mold may be used to further decrease the strain on the display while being formed into the desired curvature.

22 Claims, 10 Drawing Sheets

CURVED DEVICES

This application claims the benefit of provisional patent application No. 63/356,786, filed Jun. 29, 2022, which is hereby incorporated by reference herein in its entirety.

FIELD

This relates generally to electronic devices and, more particularly, to display devices.

BACKGROUND

Display devices may be used to display information and/or to modulate an amount of light that passes through a medium. It may be difficult to form curved display devices.

SUMMARY

A window in a system such as a vehicle or building may have window layers with curved cross-sectional profiles. For example, a vehicle window may have curved portions on left and right sides of the window. These curved portions may be formed by bending glass or other material into a desired shape. Window shaping operations may be performed by heating a planar glass layer or a layer of other material in window glass shaping equipment.

A window may have inner and outer layers. A display may be formed on one or more of the inner or outer layers. In particular, the display may be operable in a first state and a second state, and may transmit more light the first state than in the second state. In this way, light transmission through the window may be controlled by controlling the display.

To ensure that the display is not subject to an excessive amount of strain when applied to the curved window, a carrier layer may be used while the display is curved to reduce the amount of strain on the display. If desired, one or more portions of the carrier layer may be modified to distribute the strain uniformly across the display.

Alternatively or additionally, a convex mold may be used to further reduce the stress on the display as it is being formed with a desired curvature. In this way, a curved display device may be formed with an acceptable amount of strain.

DETAILED DESCRIPTION

Systems may be provided with display devices. In some systems, the display devices may be curved, such as to conform to a curved substrate. For example, the systems may have windows, such as glass windows, on which display devices may be formed to control light transmission through the windows. The systems in which the windows are used may be buildings, vehicles, or other suitable systems. Illustrative configurations in which the system is a vehicle such as an automobile may sometimes be described herein as an example. This is merely illustrative. Windows may be formed in any suitable systems.

Windows may have planar surfaces and/or curved surfaces. Windows with curved profiles may be formed by molding or otherwise shaping heated glass. For example, planar glass stock may be processed to form window layers with curved cross-sectional profiles. If desired, multiple glass layers may be laminated together for form laminated window glass. Glass layers may also be chemically and/or thermally tempered. In some embodiments, alternative materials, such as polymer materials, may be used to form the window in addition to, or as an alternative to, glass.

Figure 1:
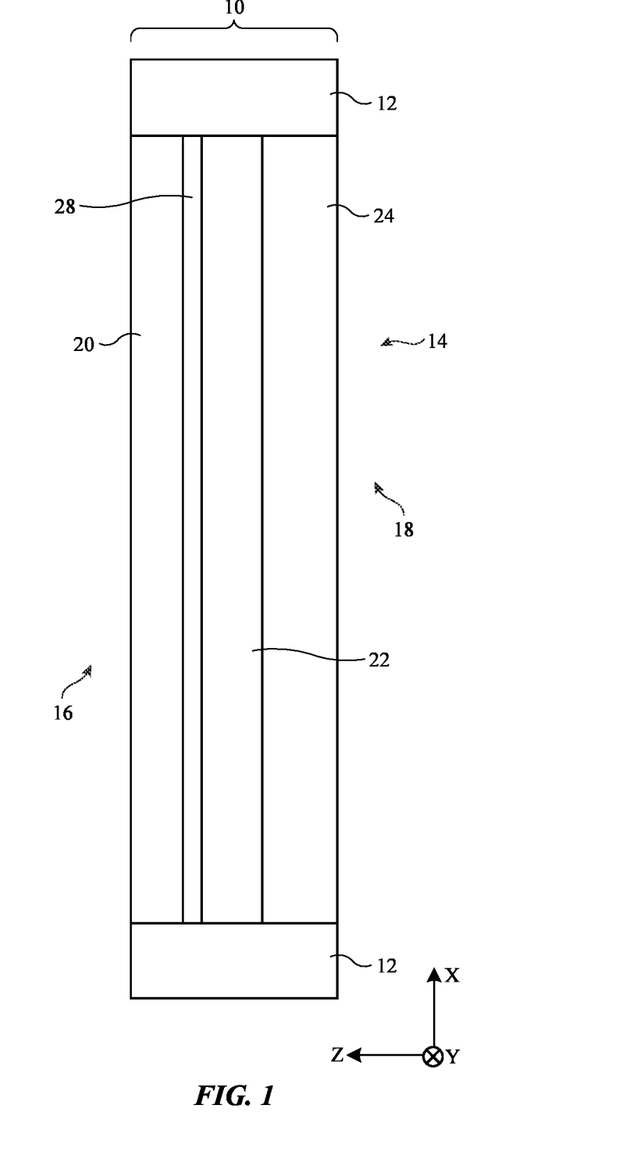
FIG. 1 is a cross-sectional view of an illustrative system with a window in accordance with an embodiment.

An illustrative system of the type that may include display devices, such as display devices on windows, is shown in FIG. 1. System 10 may be a vehicle, building, electronic device, or other type of system. In an illustrative configuration, system 10 is a vehicle. As shown in FIG. 1, system 10 may have support structures such as body 12. Body 12 may be a vehicle body that includes doors, trunk structures, a hood, side body panels, a roof, and/or other body structures. Body 12 may be configured to surround and enclose interior region 18. System 10 may include a chassis to which wheels are mounted, may include propulsion and steering systems, and may include other vehicle systems. Seats may be formed in interior region 18 of body 12. Window 14, which may be a vehicle window, and portions of body 12 may be used to separate interior region 18 of system 10 from the exterior environment (exterior region 16) that is surrounding system 10.

Windows such as window 14 may be coupled to body 12 and may be configured to cover openings in body 12. Motorized window positioners may be used to open and close windows 14, if desired. The windows in system 10 such as window 14 may include a front window mounted within an opening in body 12 at the front of a vehicle, a moon roof (sun roof) window or other window extending over some or all of the top of a vehicle, a rear window at the rear of a vehicle, and/or side windows on the sides of a vehicle. Windows in system 10 may be flat (e.g., a window may lie in the X-Y plane of FIG. 1) and/or windows in system 10 may have one or more curved portions (e.g., window 14 may have a curved cross-sectional profile with one or more bends and may be oriented to lie generally parallel to the X-Y plane so that a convex surface of window 14 faces outwardly in direction Z of FIG. 1). The area of each window 14 in system 10 may be at least 0.1 m$^2$, at least 0.5 m$^2$, at least 1 m$^2$, at least 5 m$^2$, at least 10 m$^2$, less than 20 m$^2$, less than 10 m$^2$, less than 5 m$^2$, or less than 1.5 m$^2$ (as examples).

System 10 may include control circuitry and input-output devices. Control circuitry in system 10 may include one or more processors (e.g., microprocessors, microcontrollers, application-specific integrated circuits, etc.) and storage (e.g., volatile and/or non-volatile memory). Input-output devices in system 10 may include displays, sensors, buttons, light-emitting diodes and other light-emitting devices, haptic devices, speakers, and/or other devices for providing output and/or for gathering environmental measurements and/or user input. The sensors may include ambient light sensors, touch sensors, force sensors, proximity sensors, optical sensors, capacitive sensors, resistive sensors, ultrasonic sensors, microphones, three-dimensional and/or two-dimensional images sensors, radio-frequency sensors, and/or other sensors. Output devices may be used to provide a user with haptic output, audio output, visual output (e.g., displayed content, light, etc.), and/or other suitable output. During operation, control circuitry in system 10 may gather user input, environmental information, and other information from sensors and/or other input-output devices and may control adjustable components in system 10 based on this gathered information.

Window 14 may be formed from one or more layers of transparent glass, clear polymer (e.g., polycarbonate, acrylic, etc.), polymer adhesive, and/or other layers. For example, window 14 may be formed from two glass layers or three glass layers laminated together with adhesive. The glass layers may be chemically or thermally tempered (e.g., to create compressive stress on the surfaces of the glass layers).

In the illustrative configuration of FIG. 1, window 14 is formed from outer window layer 20 and inner window layer 24 (e.g., outer and inner structural glass layers and/or other layers of transparent material). The thicknesses of layers 20 and 24 may be, for example, 0.5 mm to 3 mm, at least 0.3 mm, at least 0.5 mm, less than 4 mm, less than 3 mm, or other suitable thickness. Outer layer 20 and inner layer 24 may be laminated together using a polymer layer such as interposed adhesive layer 22 (e.g., an adhesive layer with one surface bonded to the inwardly facing surface of outer window layer 20 and an opposing surface bonded to the outwardly facing surface of inner window layer 24). Adhesive layer 22 may have a refractive index that is matched (e.g., within 0.15, within 0.1, within 0.07, within 0.05, or within 0.03) to that of layers 20 and 24. Examples of polymers that may be used for forming adhesive layer 22 include thermoplastic polyurethane, ethylene-vinyl acetate, and polyvinyl butyral. Layer 22 may, if desired, include polymer configured to provide sound dampening (e.g., a soft polyvinyl butyral sublayer or other acoustic film embedded within layer 22). Alternatively or additionally, outer layer 20 and inner layer 24 may be separated by an air gap, or by a gap filled with another substance, such as a gas, an inert gas, or vacuum.

Outer window layer 20 may be formed from a single layer of structural window glass or may include multiple sublayers such as one or more layers of glass, optically clear adhesive, and/or polymer films. Inner window layer 24 may similarly be formed from a single layer of structural window glass or may include multiple sublayers such as one or more layers of glass, optically clear adhesive, and/or polymer films. In the present example, layers 20 and 24 are glass layers formed from plate glass that is molded or otherwise formed into a desired shape (e.g., in a heated furnace that softens the glass).

If desired, optional fixed and/or adjustable optical components may be incorporated into window 14. As shown in FIG. 1, for example, one or more optical components such as optical layer 28 may be incorporated into window 14. As shown in FIG. 1, one or more layers such as optical layer 28 may be attached to an outer surface of inner layer 20. However, this location of optical layer 28 is merely illustrative. Optical layer 28 may be applied to an inner or outer surface of inner layer 20, and/or an inner or outer surface of outer layer 24, as examples. Alternatively or additionally, optical layer 28 may be formed in adhesive 22 or in the gap between outer layer 20 and inner layer 24.

Regardless of where optical layer 28 is formed within window 14, each optical layer 28 may be a fixed and/or adjustable optical layer providing fixed and/or adjustable amounts of opacity, polarization, reflection, color cast, haze, and/or other optical properties. In an illustrative configuration, optical layer 28 may be a display device (also referred to as a display herein). In particular, optical layer 28 may be a display device that is operable in various modes to allow various amounts of light through window 14. For example, layer 28 may be a liquid crystal display that exhibits electrically controllable amounts of light attenuation. In general, however, layer 28 may be any desired type of display, such as an organic light-emitting diode (OLED) display or a microLED display.

In general, system 10 may include a display device on any desired surface. An example of a display device is shown in FIG. 2.

Figure 2:
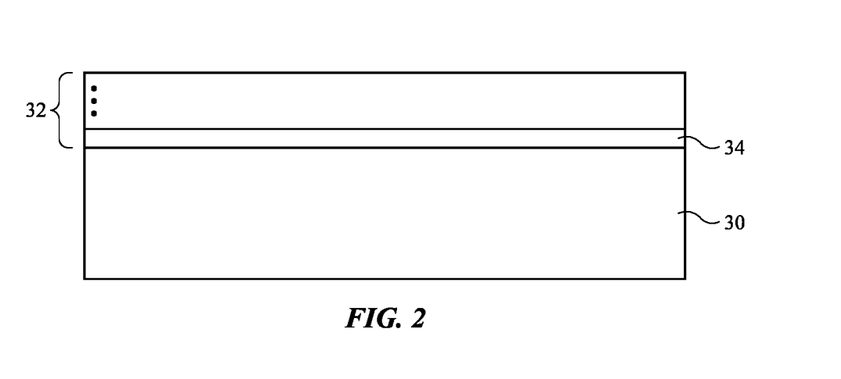
FIG. 2 is a cross-sectional side view of a glass panel with a coating in accordance with an embodiment.

As shown in FIG. 2, display device 32 may be provided on substrate 30. Substrate 30 may be a glass layer, a semiconductor layer, a sapphire layer, a ceramic layer, a polymer layer, or any other desired layer. In some embodiments, substrate 30 may be a window layer, such as inner layer 20 or outer layer 24 (FIG. 1), or substrate 30 may be a layer in an electronic device. Display device 32 may be provided on substrate 30, and may include one or more display layers 34. Display device 32 may be the same as display device 28 (FIG. 1), if desired.

Display layers 34 may include any desired display layers, such as a display substrate, an anode layer, a cathode layer, a thin-film transistor layer, a color filter layer, a liquid crystal layer, a display cover layer (e.g., a transparent layer formed from glass, sapphire, ceramic, etc.), and/or any other suitable display layers. In general, display layers 34 may include display layers that correspond to the type of display device 32.

In some embodiments, it may be desirable to apply display device 32 to a window, such as window 14 (FIG. 1). For example, it may be desirable to control the transmission of light through window 14. Display device 32 may therefore be applied to one or more layers within window 14 and be controlled by control circuitry within system 10 to control light transmission through the window. In some examples, display device 32 may be adjustable between an opaque state, in which light is blocked from passing through window 14, and a transparent state, in which light passes freely through window 14. For example, display 32 may include a liquid crystal layer that may be switched between an opaque state and a transparent state. Alternatively or additionally, display device 32 may be adjusted between these two states, such that less than 75%, less than 50%, or less than 25% of light is transmitted through window 14, as examples.

The windows in system 10 (e.g., windows 14) may be completely planar (e.g., the inner and outer surfaces of a window may be flat) and/or some or all of the windows in system 10 may have surface curvature. The inner and outer surfaces of each window may as an example, have compound curvature (e.g., non-developable surfaces characterized by curved cross-sectional profiles taken along the X and Y directions of FIG. 1) and/or may have developable surfaces (surfaces with zero Gaussian curvature that can be flattened without distortion). Curved window shapes may be formed by heating glass until the glass is sufficiently soft to shape (e.g., using a mold, using gravity, using glass slumping techniques, and/or using other glass shaping methods).

Figure 3:
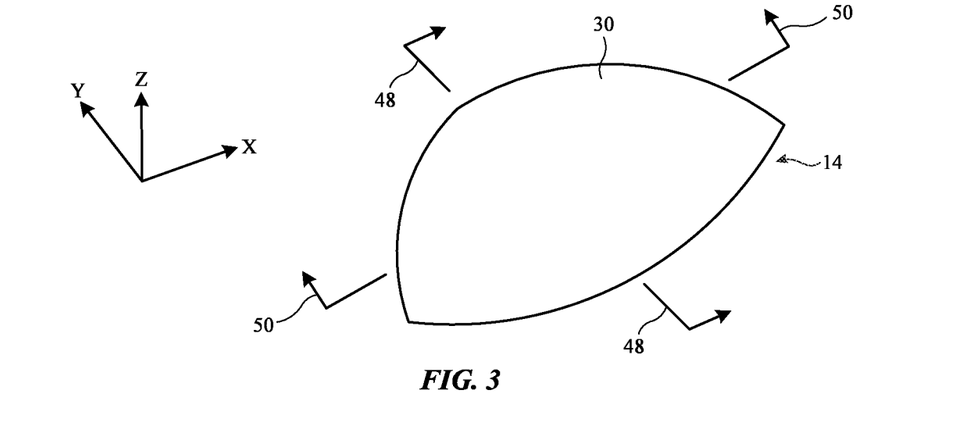
FIG. 3 is a perspective view of an illustrative glass panel in accordance with an embodiment.
Figure 4:
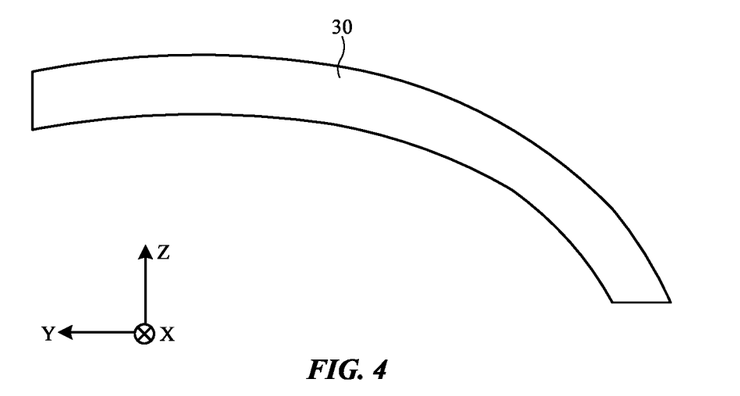
FIGS. 4 and 5 are cross-sectional side views of the illustrative glass panel of FIG. 3 in accordance with embodiments.
Figure 5:
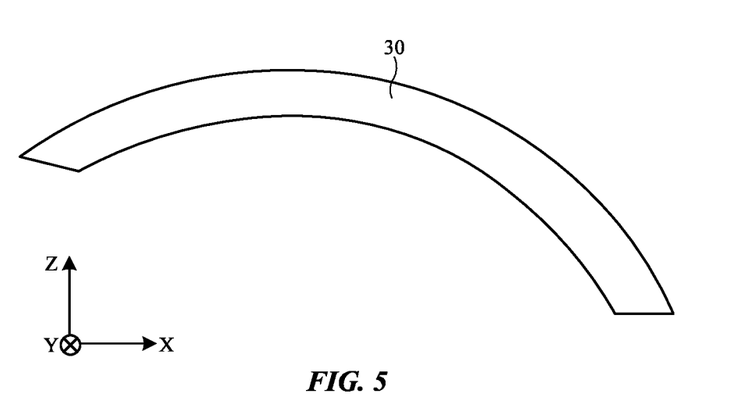

FIG. 3 is a perspective view of an illustrative curved window layer. In the example of FIG. 3, the surface of window 14 (formed by a transparent layer, such as layer 30 of FIG. 2) has compound curvature. In particular, layer 30 has a non-developable surface characterized by curved cross-sectional profiles taken along the X and Y directions of FIG. 3. FIG. 4 is a cross-sectional side view of layer 30 of FIG. 3 taken along lines 48 and viewed in the +X direction. As shown in FIG. 4, the cross-sectional profile of layer 30 viewed in the +X direction is curved. FIG. 5 is a cross-sectional side view of layer 30 of FIG. 3 taken along lines 50 of FIG. 3 and viewed in the +Y direction. As shown in FIG. 5, the cross-sectional profile of layer 30 viewed in the +Y direction is curved. Layers 30 with compound curvature may, if desired, also have one or more areas that are planar (not curved) and/or one or more areas that have developable surfaces (curved surface areas without compound curvature). In some configurations, a curved layer such as layer 30 may have only developable surfaces and no compound curvature (and may optionally have planar portions). Arrangements in which curved layers for window 14 such as layer 30 have only compound curvature or a combination of one or more areas of compound curvature and one or more flat areas may also be used. The process of forming layer 30 into a shape with a curved cross-sectional profile may sometimes be referred to as bending or shaping. One or more layers 30 may be used in forming window 14 and each layer 30 (and window 14) may have any suitable outline (rectangular, triangular, circular, shapes with curved edges and/or straight edges, etc.).

It may be desirable to apply displays to a curved layer, such as layer 30, to control light transmission through window 14, or otherwise form a curved display. However, curving displays may apply excessive strain on display layers and may result in undesirable mura on the displays. Excessive strain may also damage layers within a display, such as cracking or other damage in conductors and organic and inorganic dielectric layers. To help reduce the amount of strain applied to a curved display, a carrier layer may be used when the display is being curved. By reducing the amount of strain on a display, there may be fewer or no cracks on layers within the display, and display mura may be reduced or eliminated. An illustrative example of using a carrier layer is shown in FIG. 6A.

Figure 6A:
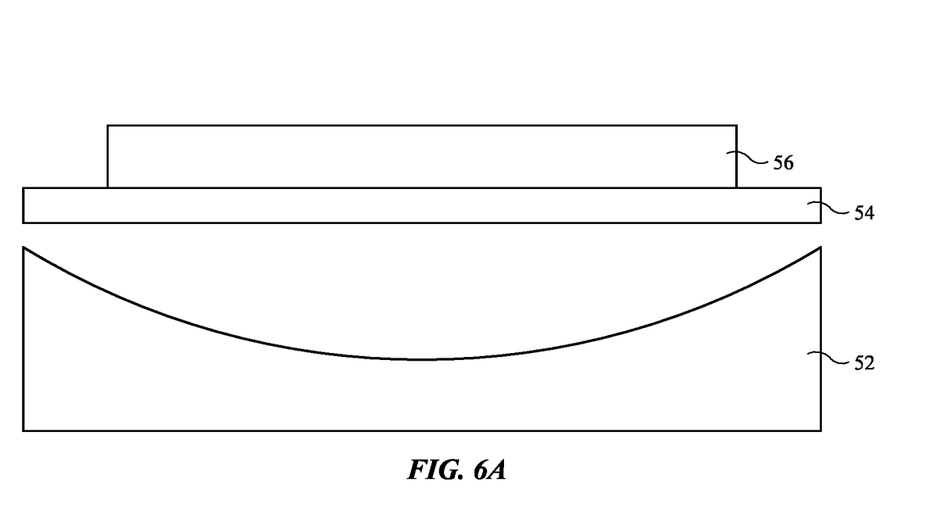
FIG. 6A is a side view of a mold and carrier used to form a curved display in accordance with an embodiment.

As shown in FIG. 6A, display 56 (which may be the same as display device 28 (FIG. 1) and/or display 32 (FIG. 2), if desired) may be applied to carrier 54 (also referred to as a carrier film herein), such as by using an adhesive (e.g., pressure sensitive adhesive) or other suitable material. Display 56 may also referred to as display cell 56 or cell 56 herein. Carrier 54 and display 56 may then be formed to a desired curvature using mold 52. In some examples, carrier 54 and display 56 may be heated, placed into mold 52, and then cooled. Carrier 54 and display 56 may then retain a curvature that matches the curvature of mold 52. However, this is merely illustrative. Any desired method may be used to bend display 56 within mold 52.

Display cell 56 may have a thickness of 200 microns or less, 175 microns or less, 150 microns or more, or any other desired thickness. Cell 56 may include display layers (such as display layers 34 of FIG. 2) formed on a display substrate. The display substrate may be formed from any desired material, such as glass, silicon oxide, plastic, or any other desired substrate.

Carrier 54 may have a thickness of at least 100 microns, at least 125 microns, less than 200 microns, or at least 150 microns, as examples. Carrier 54 may be formed of any desired material, such as polyethylene terephthalate (PET). In general, the use of carrier 54 may reduce the strain on display 56 while it is being formed to the desired curvature. For example, using carrier 54 may reduce the strain on display 56 to 12% or less, 15% or less, 10-15%, as examples.

Although FIG. 6A shows display cell 56 directly attached to carrier 54 (e.g., with adhesive), this is merely illustrative. In some embodiments, a liner may be used between display cell 56 and carrier 54 to decouple display cell 56 from carrier 54 and reduce the strain on display cell 56. An illustrative example of using an intervening liner is shown in FIG. 6B.

Figure 6B:
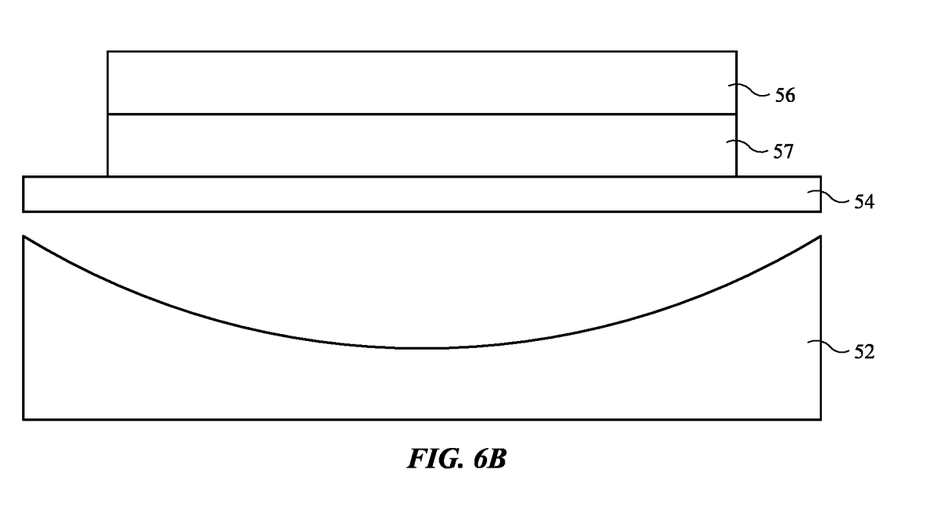
FIG. 6B is a side view of a mold, carrier, and liner used to form a curved display in accordance with an embodiment.

As shown in FIG. 6B, liner 57 may be interposed between display 56 and carrier 54. Liner 57 may be formed from polytetrafluoroethylene (PTFE) or other low-friction material. Liner 57 may have a thickness of 25 microns or more, between 25 microns and 100 microns, less than 150 microns, greater than 50 microns, or other suitable thickness. Display 56 may be applied directly to liner 57 and may form with liner 57 due to friction. Alternatively, adhesive may be applied between liner 57 and display cell 56.

Generally, using liner 57 may decouple display cell 56 from carrier 54. In particular, because display cell 56 is not adhesively bonded to carrier 54, display cell 56 may be subject to less strain when formed using mold 52. If desired, the amount of adhesive between carrier 54 and liner 57 and/or between liner 57 and display cell 56 may be adjusted to adjust the strain applied to cell 56.

Figure 7A:
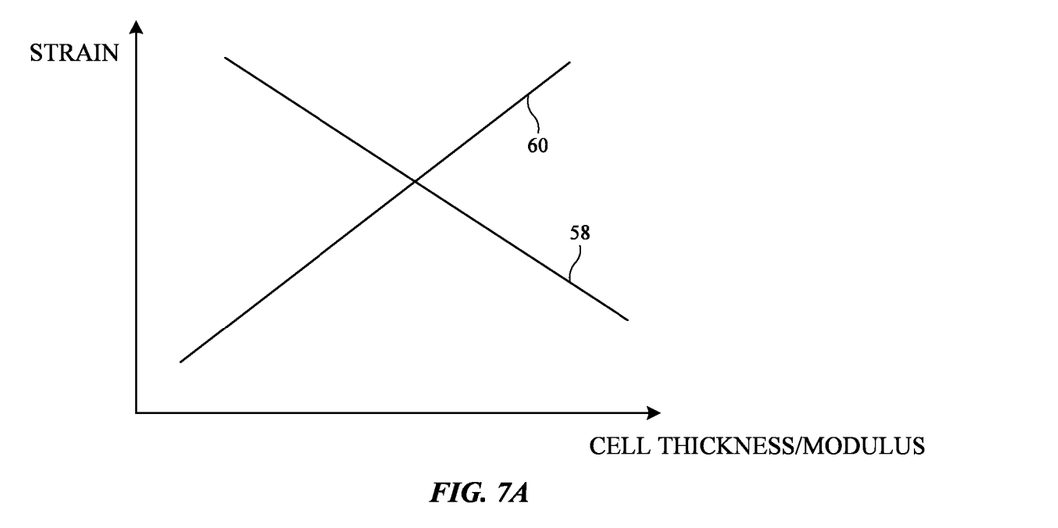
FIG. 7A is a graph of an illustrative relationship between cell thickness and cell strain in accordance with an embodiment.
Figure 7B:
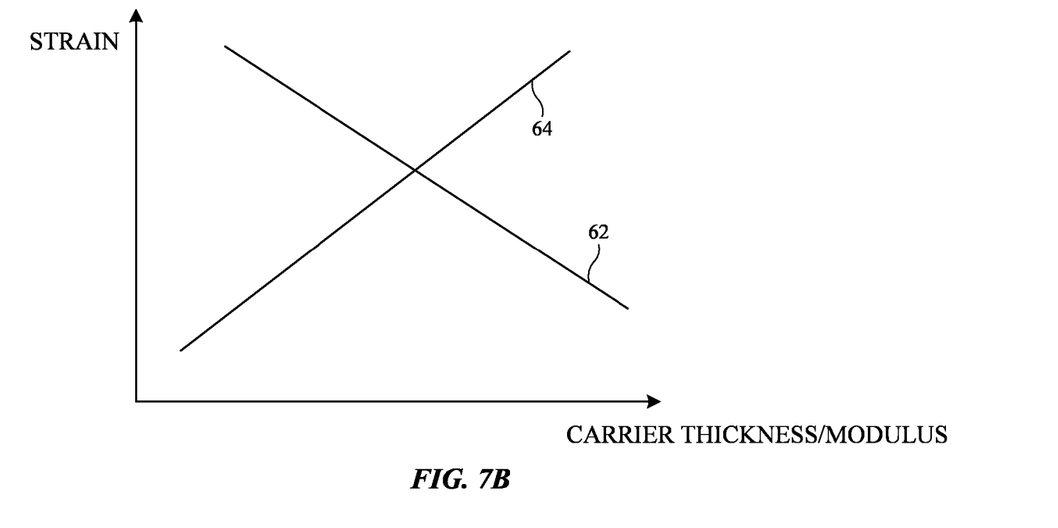
FIG. 7B is a graph of an illustrative relationship between carrier thickness and cell strain in accordance with an embodiment.
Figure 7C:
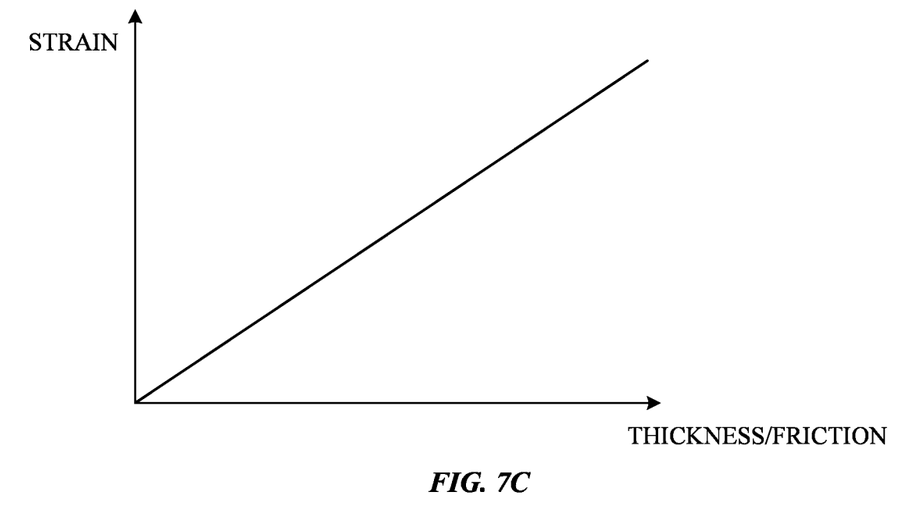
FIG. 7C is a graph of an illustrative relationship between carrier thickness/friction and cell strain in accordance with an embodiment.
Figure 7D:
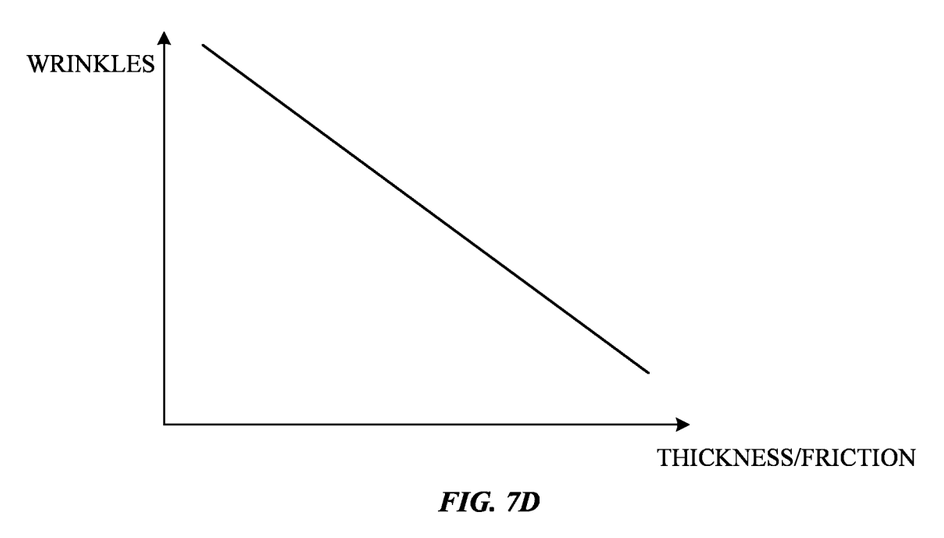
FIG. 7D is a graph of an illustrative relationship between carrier thickness/friction and display wrinkling in accordance with an embodiment.

The material and thickness of both carrier 54 and display 56 may impact the strain on display 56. Additionally, the amount of friction between carrier 54 and display 56 (e.g., the presence of liner 57) may impact the strain on display 56, as well as whether display 56 wrinkles when formed. Illustrative relationships between the material and thickness of carrier 54 and display 56 vs. the strain on cell 56 and carrier 54 during forming are shown in FIGS. 7A and 7B. Illustrative relationships between the friction between carrier 54 and display 56 vs. the strain on cell 56 and wrinkling of display 56 are shown in FIGS. 7C and 7D.

As shown in FIG. 7A, the thickness and modulus of elasticity of cell 56 may affect the strain on cell 56 and carrier 54 during forming. As shown by line 58, as the thickness and modulus of cell 56 increases, the strain on cell 56 during forming may decrease. However, as shown by line 60, as the thickness and modulus of cell 56 increases, the strain on carrier 54 may increase. Additionally, using cell 56 with a high thickness and modulus may decrease the formability of cell 56, meaning that it may be more difficult to form cell 56 into the desired curvature.

As shown in FIG. 7B, the thickness and modulus of elasticity of carrier 54 may also affect the strain on cell 56 and carrier 54 during forming. As shown by line 62, as the thickness and modulus of carrier 54 increases, the strain on carrier 54 may decrease. Additionally, having a thicker/higher modulus carrier 54 may improve the formability of carrier 54 and cell 56 as it is being formed into the desired curvature. However, as shown by line 64, as the thickness and modulus of carrier 54 increases, the strain on cell 56 may increase.

Therefore, the thickness and modulus of elasticity of both carrier 54 and cell 56 may be chosen to minimize the strain on cell 56 during forming. For example, using carrier 54 and cell 56 of appropriate thicknesses and moduli may reduce the strain on display 56 to 12% or less, 15% or less, 10-15%, as examples.

As shown in FIG. 7C, as the friction between cell 56 and carrier 54 increases, the strain on cell 56 also increases. By incorporating liner 57 between cell 56 and carrier 54 (FIG. 6B), there is less friction between cell 56 and carrier 54 and therefore less strain applied to cell 56. However, as shown in FIG. 7D, lower friction between cell 56 and carrier 54 may also cause more wrinkles in display 56.

Therefore, the friction between cell 56 and carrier 54 may be adjusted to lower the strain on cell 56 to a suitable amount (e.g., less than 10%, less than 5%, or other suitable strain), while preventing wrinkling on the display. The friction may be adjusted by the presence and thickness of liner 57, the presence and thickness of adhesive between display 56 and liner 57, the presence and thickness of adhesive between liner 57 and carrier 54, and/or the presence of a lubricant.

In addition to, or as an alternative to, using a carrier layer and/or liner to reduce the strain on a curved display, a convex mold may be used when curving the display layers to further reduce the strain on the display during forming. An example of an illustrative convex mold that may be used is shown in FIG. 8.

Figure 8:
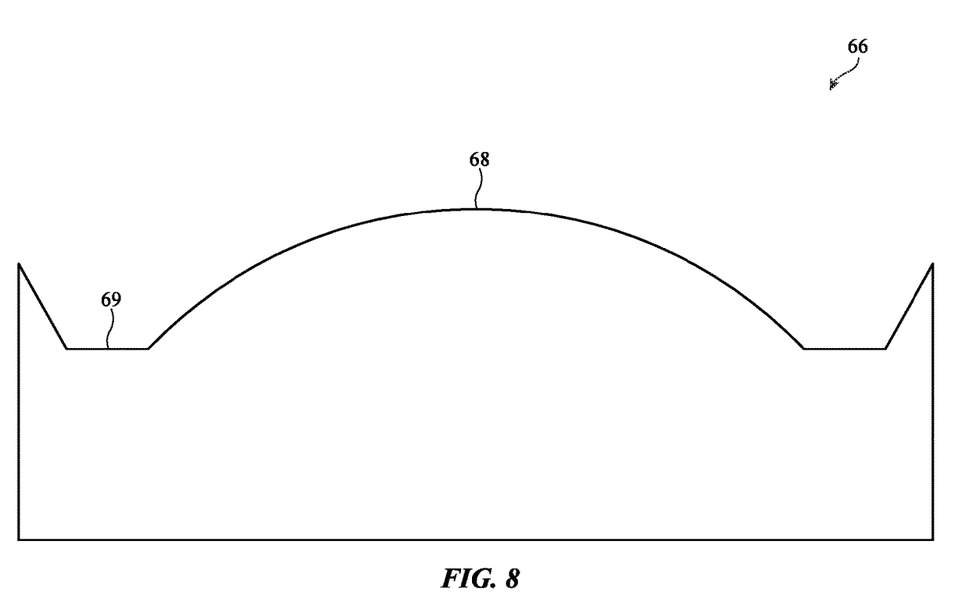
FIG. 8 is a side view of an illustrative convex mold in accordance with an embodiment.

As shown in FIG. 8, mold 66 may be used when forming cell 56 into the desired curvature. Whereas mold 52 of FIG. 6 was a concave mold, mold 66 is a convex mold have convex curved surface 68. In other words, cell 56 and carrier 54 may be formed into a convex curve when formed using convex mold 66.

Using convex mold 66 rather than concave mold 52 may reduce the strain on cell 56 by at least 5% or by at least 7%, as examples. Therefore, if used in combination with carrier layer 54 of FIG. 6, the strain on cell 56 during the forming operation may be 10% or less, 7% or less, or 5% or less, as examples (with a minimum strain of 0.5%, 1%, or 1.5% across cell 56 due to its curvature, as examples). In this way, the overall strain on cell 56 (display 56) may be reduced when forming the display into a desired curvature. By reducing the strain on display 56, the display may have reduced mura across the display.

If desired, one or more surfaces of convex mold 66, such as mold portion 69, may be rounded to allow a carrier to both form on and release from mold 66 more effectively.

Although using carrier 54 and/or convex mold 66 when forming a display into a desired curvature may reduce the overall strain on the display, there may be regions of the display that are subject to more strain than other regions of the display. Therefore, it may be desirable to distribute the strain on the display more evenly. To distribute the strain more evenly, a region of the carrier (e.g., carrier 54) may be modified. In addition to distributing the strain more evenly, modifying the carrier may also further reduce the strain on the curved display. An example of a modified carrier is shown in FIGS. 9A and 9B.

Figure 9A:
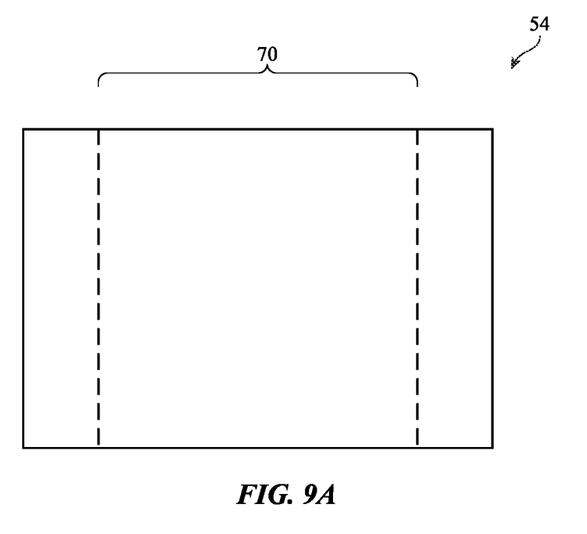
FIG. 9A is a top view of an illustrative carrier having modified regions to improve strain uniformity in accordance with an embodiment.

As shown in FIG. 9A, a carrier, such as carrier 54, may have a modified region 70. Modified region 70 may be in the center of carrier 54 as an example. In general, modified region 70 may be modified to have openings, have a different modulus of elasticity, have a different thickness, or otherwise exhibit different properties from the area around modified region 70. In some examples example, a patch may be selectively applied to carrier 54 to modify region 70. An example of a patch that may be used with carrier 54 is shown in FIG. 9B.

Figure 9B:
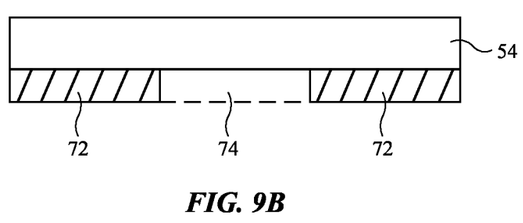
FIG. 9B is a cross-sectional side view of an illustrative patch applied in desired modified regions of a carrier to improve strain uniformity in accordance with an embodiment.

As shown in FIG. 9B, patch 72 may be applied to carrier 54. In particular, patch 72 may be applied to the edges of carrier 54, leaving gap 74. Patch 72 may have a thickness of at least 75 microns, between 75 microns and 125 microns, between 125 microns and 200 microns, of less than 125 microns, of greater than 50 microns, as examples. Patch 72 may be formed from any desired material, such as a polymer. In general, it may be desirable to use a patch with a relatively high modulus of elasticity, such as a modulus of at least 1.0 GPa. If desired, a lubricant may be added to patch 72 to reduce the friction of patch 72 on a mold during forming.

By incorporating patch 72 at the edges of carrier 54 while leaving gap 74, patch 72 may distribute the strain applied to cell 56 more evenly than if a patch is not used. For example, if a patch is not used, cell 56 may have more strain on the edges than in the center, while a patch of the type shown in FIG. 9B may redistribute the strain more evenly across cell 56 (e.g., by slightly increasing strain on cell 56 in the center while decreasing strain on cell 56 at the edges). In some examples, cell 56 may have a maximum strain of 7% or less, 5% or less, or 10% or less across an entirety of cell 56 (i.e., across an entirety of the display) when formed using a patch, such as patch 72. In other words, by using patch 72 to local stiffen carrier 54, the strain uniformity across cell 56 may be improved.

Although the example of FIG. 9B shows a patch having two regions with a gap, this is merely illustrative. In general, a patch may be formed on carrier 54 in any desired manner to improve the strain uniformity across cell 56. Some illustrative configurations of a patch are shown in FIGS. 10A-D.

Figure 10A:
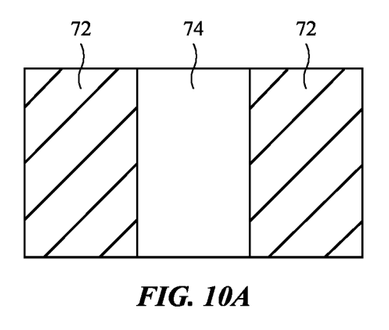
FIGS. 10A-10D are top view of different illustrative patch patterns applied to desired modified regions of a carrier to improve strain uniformity in accordance with an embodiment.
Figure 10B:
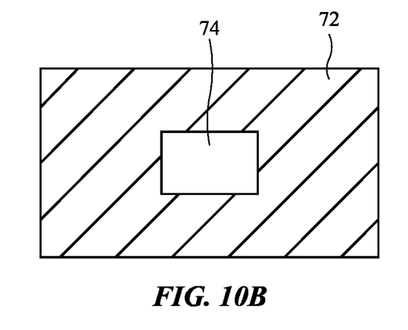
Figure 10C:
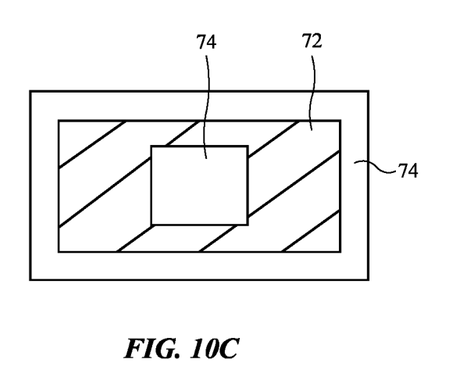
Figure 10D:
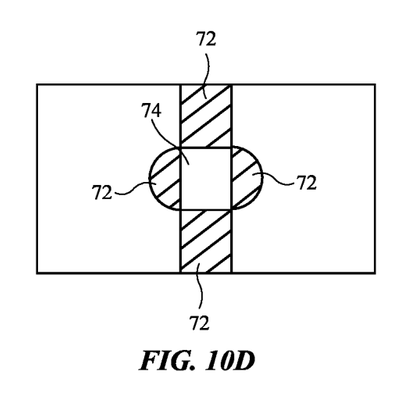

As shown in FIG. 10A, patch 72 may be applied to the edge regions of carrier 54, leaving gap 74 extending from one edge to another edge of carrier 54. FIG. 10A may be a top view of the arrangement shown in FIG. 9B, for example. Alternatively, patch 72 may extend around a periphery of carrier 54 and may have opening 74 at the center of patch 72 as shown in FIG. 10B. If desired, patch 72 may extend around an inset portion of carrier 54 and leave both opening 74 and peripheral region 74 of carrier 54 uncovered, as shown in FIG. 10C. As another example, patch 72 may have upper and lower rectangular portions and central hemispherical portions with an opening 74 and an uncovered peripheral region 74 of carrier 54, as shown in FIG. 10D. In general, patch 72 may have any desired shape. The shape and arrangement of patch 72 may be selected to distribute strain evenly across cell 56.

Although carrier 54 has been described as having patch 72 to modify a region of the carrier and increase the uniformity of strain across cell 56, this is merely illustrative. In general, carrier 54 may be modified in any desired fashion to distribute the strain more uniformly. As examples, carrier 54 may have one or more openings (such as an array of punch holes in the center of carrier 54), one or more thinned regions, or one or more regions formed from material with a different modulus of elasticity. By modifying carrier 54 to have regions with different formability and flexibility, the strain on cell 56 may be more uniformly distributed across cell 56.

Figure 11:
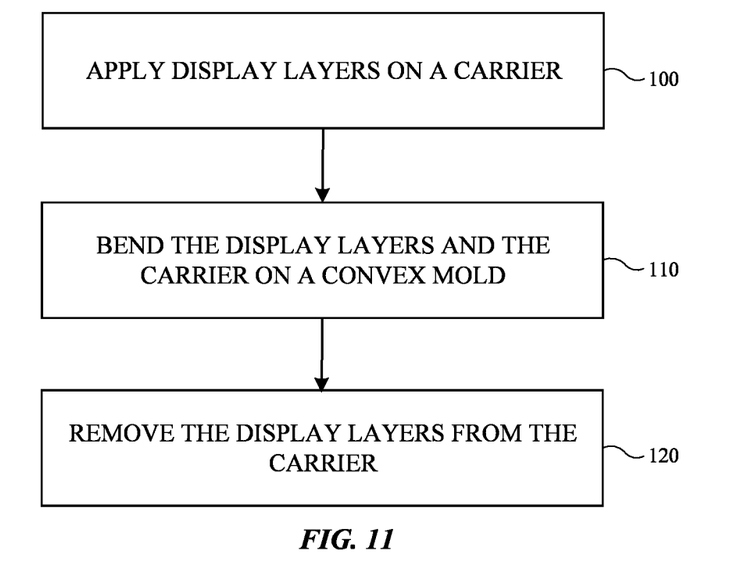
FIG. 11 is a flowchart of illustrative steps used in forming a curved display in accordance with an embodiment.

In general, a display may be formed to a desire curvature using a carrier and a mold in any desired method. One example of a method that may be used to form a display into a desired curvature is shown in FIG. 11.

At step 100, a display (such as display/cell 56) may be applied to a carrier (such as carrier 54). The carrier may have any desired thickness, such as at least 125 microns. The display may have a thickness of 200 microns or less, as an example. In some illustrative embodiments, the carrier may be modified to improve strain uniformity across the display, such as by applying a patch (such as patch 72) to the carrier. The patch may have a thickness of a thickness of at least 75 microns, as an example. Alternatively or additionally, the carrier may be modified by forming openings in the carrier.

In some embodiments, a liner may be applied between the display and the carrier. The liner may be formed from polytetrafluoroethylene (PTFE) or other low-friction material, and the liner may have a thickness of 25 microns or more, between 25 microns and 100 microns, less than 150 microns, greater than 50 microns, or other suitable thickness. In general, the liner may decouple the display from the carrier to reduce the strain on the display due to bending the display.

At step 110, the carrier and display may be bent in a convex mold, such as convex mold 66. Prior to bending the carrier and the display, the carrier and display may be heated, lubricated, and/or otherwise preprocessed to prepare the carrier and display to bend when inserted into the convex mold.

At step 120, the display may be removed from the carrier. In this way, the display may have a curvature that matches the curvature of the convex mold. If desired, the curved display may then be coupled, mounted, or attached to a curved layer, such as a window layer.

The foregoing is merely illustrative and various modifications can be made to the described embodiments. The foregoing embodiments may be implemented individually or in any combination.

What is claimed is:

1. A window, comprising:
   a curved window layer; and
   a display on the curved window layer, wherein the display is configured to operate in a first state and in a second state, the display transmits more visible light in the first state than in the second state, and the display has a maximum strain of 10% and a minimum strain of 0.5% across an entirety of the display.

2. The window defined in claim 1, wherein the curved window layer has a compound curvature and wherein the display comprises a liquid crystal device having a liquid crystal layer, the window further comprising:
   control circuitry that is configured to switch the liquid crystal layer from a transparent mode to a non-transparent mode to switch the display from the first state to the second state.

3. The window defined in claim 2, wherein the display has a maximum strain of 7% and a minimum strain of 1.5% across the entirety of the display.

4. The window defined in claim 3, wherein the display has a thickness of 200 microns or less across a surface of the curved window layer.

5. The window defined in claim 1, wherein the display has a maximum strain of 5% or less across the entirety of the display.

6. The window defined in claim 1, wherein the display is a liquid crystal device comprising a liquid crystal layer that is configured to be modulated to switch the display between the first state and the second state.

7. The window defined in claim 1, wherein the display comprises a display device selected from the group consisting of: an organic light-emitting diode display and a microLED display.

8. A method of forming a curved display, comprising:
   applying display layers to a carrier;
   bending the carrier and the display layers in a convex mold;
   modifying a region of the carrier to increase strain uniformity across the display layers; and
   removing the display layers from the carrier.

9. The method defined in claim 8, wherein applying the display layers comprises applying the display layers to the carrier having a thickness of at least 125 microns.

10. The method defined in claim 9, wherein applying the display layers further comprises applying the display layers with a thickness of 200 microns or less.

11. The method defined in claim 8, wherein modifying the region of the carrier comprises applying a patch to the region of the carrier.

12. The method defined in claim 11, wherein applying the patch comprises applying the patch with a thickness of at least 75 microns.

13. The method defined in claim 8, wherein modifying the region of the carrier comprises forming openings in the carrier within the region.

14. The method defined in claim 8, wherein bending the carrier and the display layers in the convex mold comprises bending the carrier and the display layers on rounded edges of the convex mold.

15. The method defined in claim 8, further comprising:
   applying the display layers to a liner, wherein applying the display layers to the carrier comprises applying the display layers and the liner to the carrier.

16. A display, comprising:
   a curved display substrate having a first curvature; and
   a display layer on the curved display substrate, wherein the display layer is curved with a second curvature that matches the first curvature, and the display layer has a maximum strain of 10% across an entirety of the display layer.

17. The display defined in claim 16, wherein the display layer has a minimum strain of 1.5% across the entirety of the display layer.

18. The display defined in claim 17, wherein the display layer has a thickness of at least 200 microns.

19. The display defined in claim 16, wherein the display layer is a layer selected from the group consisting of: an organic light-emitting diode display layer, a liquid crystal display layer, and a microLED display layer.

20. The display defined in claim 19, wherein the first curvature and the second curvature are compound curvatures.

21. The display defined in claim 16, wherein the display layer has a maximum strain of 5% across the entirety of the display layer.

22. The display defined in claim 16, wherein the display layer has a strain uniformity of at least 90%.

\* \* \* \* \*